United States Patent [19]
Nishitani et al.

[11] Patent Number: 5,543,672
[45] Date of Patent: Aug. 6, 1996

[54] ROTATION DETECTING DEVICE WITH MAGNET BRAKE

[75] Inventors: Katsuo Nishitani; Masaki Hirota; Takeshi Ai, all of Shimada, Japan

[73] Assignee: Yazaki Corporation, Tokyo, Japan

[21] Appl. No.: 596,132

[22] Filed: Oct. 11, 1990

[30] Foreign Application Priority Data

| Oct. 18, 1989 | [JP] | Japan | 1-120920 U |
| Dec. 5, 1989 | [JP] | Japan | 1-140294 U |
| Mar. 27, 1990 | [JP] | Japan | 2-30473 U |
| Jul. 10, 1990 | [JP] | Japan | 2-72653 U |

[51] Int. Cl.$^6$ .......... H02K 49/10; H02K 7/12; F16F 15/03; G01P 3/46
[52] U.S. Cl. .......... 310/77; 188/164; 310/75 D; 310/156; 324/174
[58] Field of Search .......... 188/161, 163, 188/164, 267; 310/77, 78, 156, 51, 75 R, 75 D; 324/167, 173, 174, 207.25

[56] References Cited

U.S. PATENT DOCUMENTS

| 3,403,276 | 9/1968 | Baker, Jr. | 310/156 |
| 3,619,676 | 11/1971 | Kawakami | 310/78 |
| 3,784,913 | 1/1974 | Maass | 324/173 |
| 3,790,889 | 2/1974 | Mincuzzi | 324/167 |
| 4,646,042 | 2/1987 | Eshelman | 324/174 |
| 4,844,220 | 7/1989 | Maji et al. | 188/164 |
| 4,885,489 | 12/1989 | Stuhr | 310/78 |

*Primary Examiner*—William H. Beha, Jr.
*Assistant Examiner*—D. L. Rebsch
*Attorney, Agent, or Firm*—Armstrong, Nikaido, Marmelstein, Kubovcik & Murray

[57] ABSTRACT

A rotation detecting device for vehicle speedometers includes a housing, a magnetic induction device, and a magnetized rotor near the magnetic induction device. The rotor is connected through a coupling to a rotation source. A braking device forms a magnetic circuit between one end surface of the rotor and the housing, and brings the rotor into pressure contact with the housing by a magnetic attraction force generated in the magnetic circuit. Accordingly, a stable and proper braking torque can be applied against rotor vibration, to prevent a false output signal while idling. Furthermore, the amount of wear of a bearing for rotatably supporting a rotating shaft of the rotor can be reduced to improve durability of the rotation detecting device by reducing the braking torque during high-speed rotation of the rotor.

6 Claims, 7 Drawing Sheets

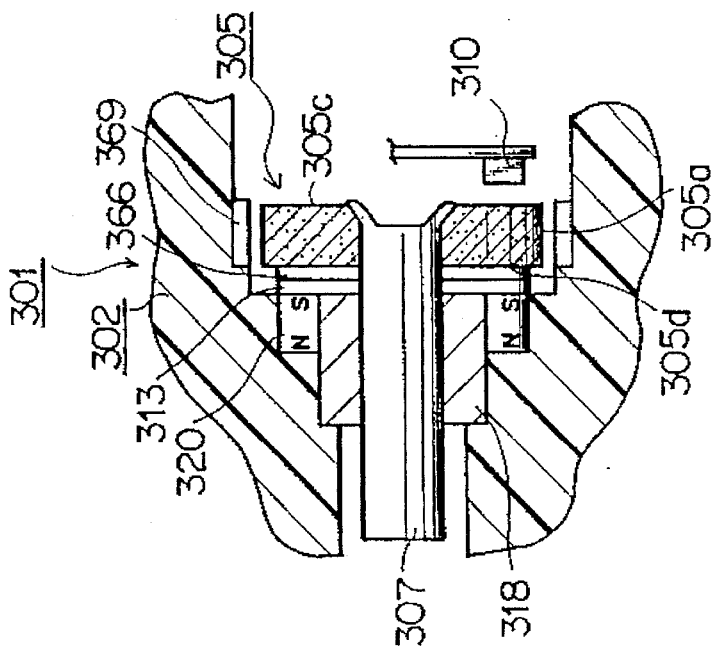
FIG. 10
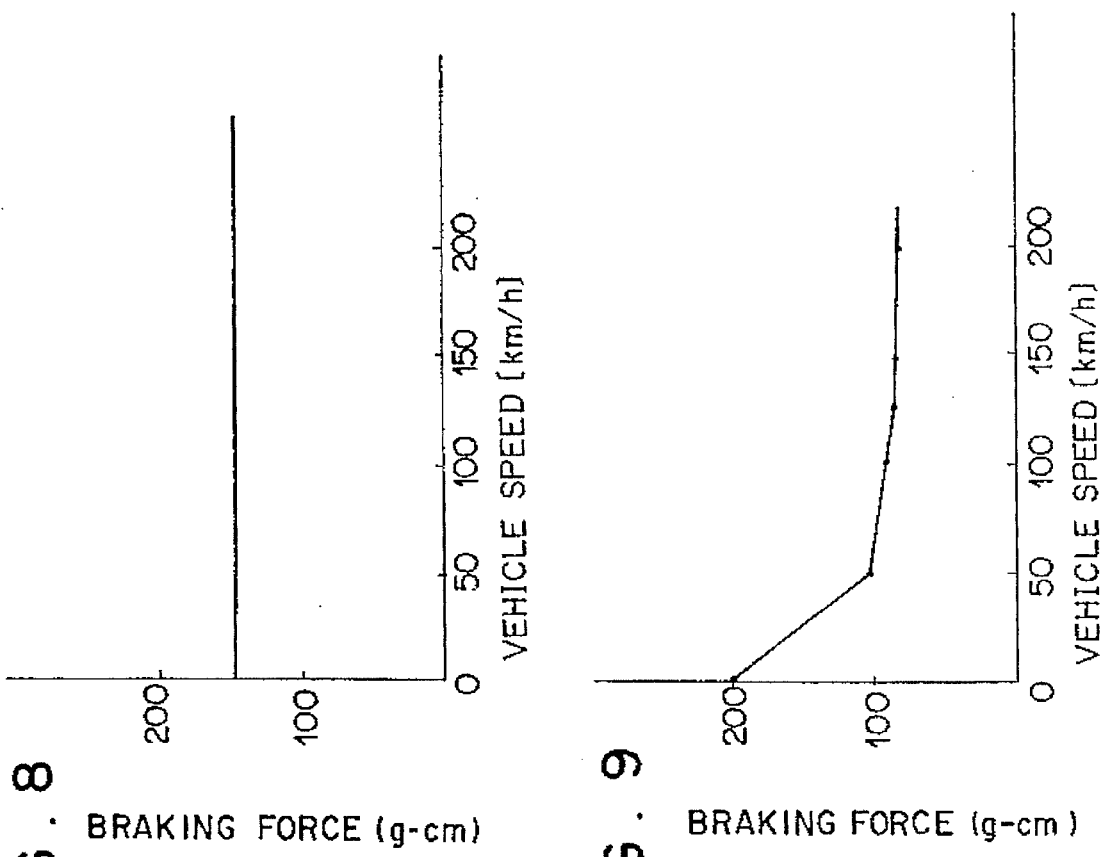
FIG. 8
FIG. 9

ROTATION DETECTING DEVICE WITH MAGNET BRAKE

BACKGROUND OF THE INVENTION

The present invention relates to a rotation detecting device, and more particularly to a rotation detecting device adapted to be mounted to a transmission or the like of an automobile for converting rotation of the transmission to an electric signal and outputting the electric signal to an indicating instrument or the like.

Conventionally, a semiconductor type rotation detecting device is often used as a vehicle speed sensor to be mounted on an automobile. The semiconductor type rotation detecting device includes a magnetic induction device and a magnet located near the magnetic induction device. Rotation of a transmission of an automobile is transmitted to the magnet, and a change in magnetic field due to the rotation of the magnet is detected by the magnetic induction device. An electric signal generated from the magnetic induction device is output to an indicating instrument or the like.

FIG. 16 shows such a prior art rotation detecting device. Referring to FIG. 16, a rotation detecting device 401 includes a cylindrical housing 402 in which rotating portion 403 and current feeding portion 404 are installed as a unit.

A rotor 405 is rotatably provided in the rotating portion 403. An outer circumferential surface 405a of the rotor 405 is magnetized to have multiple poles. An input rotating shaft 407 is rotatably supported to a bearing 418, and is fixedly engaged with a central portion of the rotor 405. The input rotating shaft 407 is formed with a hollow portion 408. A connecting portion 460 is formed at one end of a coupling 409 to be connected to a rotational driving source of a transmission (not shown), and the connecting portion 460 is inserted in the hollow portion 408 of the input rotating shaft 418. Thus, the rotation of the transmission is transmitted to the rotor 405.

A thrust washer 413 is provided to contact one end surface of the rotor 405, and a spring 412 for biasing the rotor 405 toward the bearing 418 is provided on the opposite side of the rotor 405 with respect to the thrust washer 413. That is, the thrust washer 413 is biased by the spring 412 to surface-contact the end surface of the rotor 405, thereby applying a given braking torque to the rotor 405 as shown in FIG. 17, so as to prevent play rotation of the rotor 405 to be caused by vibration or the like under a stop or idling of the vehicle.

A magnetic induction device 410 such as a Hall device is provided in the current feeding portion 404 at a position near the rotor 405 so as to be opposed to an outer circumferential surface of the rotor 405. Further, a base 414 for receiving an electric signal to be generated from the magnetic induction device 410 is provided in the current feeding portion 404. The base 414 is connected to a lead wire 415 so as to output the electric signal through the lead wire 415 to an indicating instrument or the like (not shown).

In the rotation detecting device 401, the rotor 405 tends to be rotated in a small angular range because of play generated at a connecting portion between the rotational driving source of the transmission and the coupling. Occasionally, such play rotation of the rotor 405 causes a problem, such that although no rotation of the transmission is transmitted to the rotor 405, an electric signal indicative of rotation of the rotor 405 is erroneously output from the magnetic induction device 410. To avoid such a problem, a braking mechanism for preventing the play rotation of the rotor 405 is provided in the rotation detecting device 401. The braking mechanism is constructed of the thrust washer 413 for urging rotor 405 toward bearing 418 and spring 412 for biasing the thrust washer 413. The thrust washer 413 is biased to surface-contact the end surface of the rotor 405, so that a predetermined braking force to be obtained by multiplying the load of spring 412 by a coefficient of fiction of the thrust washer 413 is applied to the rotor 405, thus preventing malfunction of the rotation detecting device due to the play rotation of the rotor 405.

However, in the above-mentioned rotation detecting device, as the braking force is obtained by multiplying the load of the spring 412 by the coefficient of friction of the thrust washer 413, the braking force will be reduced as time proceeds because of settling, wearing, etc. of the spring 412. Moreover, as shown in FIG. 2, the degree of reduction in braking force is remarkably large in an initial stage. Thus, there is a problem in respect of durability of the device.

As shown in FIG. 8, the braking force to be obtained by the spring 412 is constant irrespective of a vehicle speed. On the other hand, as shown in FIG. 9, it is apparent that a sufficient braking torque is required only under a stop or low-speed running condition of the vehicle where the play rotation of the rotor 405 tends to occur and that so large a braking torque is not required under a high-speed running condition of the vehicle. Such an optimum braking characteristic as shown in FIG. 9 cannot be obtained in the above conventional rotation detecting device since the braking force is obtained by multiplying the load of the spring 412 by the coefficient of friction of the thrust washer 413, and it is constant irrespective of a vehicle speed. Furthermore, as the load of spring 412 is always applied to thrust washer 413, the durability is reduced.

Further, as an end surface of the spring 412 is inclined with respect to a biasing direction in general, the end surface of the spring 412 does not uniformly abut against the thrust washer 413. Accordingly, as shown in FIG. 18, a braking force is varied according to a circumferential position of the spring 412, resulting in fluctuation of the braking characteristic of the rotor 405.

Further, as the braking torque to be applied to the rotor 405 is obtained by the biasing force of the spring 412 only in a thrust direction of the rotor 405, an amount of wear of the bearing 418 due to the thrust load of the spring 412 becomes large in the case of driving the rotor 405 at high speeds, thus causing a reduction in durability of the rotation detecting device.

SUMMARY OF THE INVENTION

It is an object of the present invention to provide a rotation detecting device which can apply a stable and proper braking torque to the rotor and reduce an amount of wear of the bearing to improve a durability of the device by reducing the braking torque during high-speed rotation of the rotor.

To achieve the above object, there is provided in a rotation detecting device including a housing, a magnetic induction device provided in said housing, and a magnetized rotor rotatably provided in said housing near said magnetic induction device, said rotor being connected through a coupling to a rotation output source; the improvement comprising braking means forming a magnetic circuit between one end surface of said rotor and said housing and bringing said rotor into pressure contact with said housing by a magnetic attraction force to be generated in said magnetic circuit.

The braking means may comprise a magnet and a brake disk provided on said rotor.

The braking means may comprise a temperature sensing magnetic member having a magnetic permeability to be reduced by heat to be generated from a contact portion between said rotor and said housing. With this construction, when the rotor is rotated at high speeds to generate a large frictional heat in the contact portion, a braking force owing to the magnetic attraction force is reduced. Accordingly, only during low-speed rotation of the rotor which tends to cause play rotation of the rotor, that is, only under a stop or low-speed running condition of a vehicle, a sufficient braking torque can be obtained.

The above effect may be achieved by the construction that the braking means comprises a magnet having multiple poles and a braking yoke which generates an eddy current to reduce a braking torque to be applied to said rotor.

In addition to the above-mentioned braking means for bringing the rotor into pressure contact with the housing, the rotation detecting device may be provided with another braking means forming another magnetic circuit between an outer circumferential surface of said rotor and said housing so as to generate a braking torque between said rotor and said housing. With this construction, a braking torque in a circumferential direction of the rotor can be obtained in addition to a braking torque in a thrust direction of the rotor. Accordingly, a thrust load can be reduced to thereby improve durability of the rotation detecting device.

Further, according to the present invention, the other end surface of said rotor not contacting said housing is magnetized, and said magnetic induction device is located in opposed relationship to the other end surface. With this construction, a change in magnetic field along the end surface of the rotor can be detected. Accordingly, an axial length of the rotor can be reduced as compared with the prior art wherein an outer circumferential surface of the rotor is magnetized. Thus, an overall construction of the rotation detecting device can be made compact.

BRIEF DESCRIPTION OF THE DRAWINGS

FIG. 8 is a graph showing a braking characteristic in the prior art device using a spring;

FIG. 9 is a graph showing an optimum braking characteristic to be required in the rotation detecting device;

FIG. 10 is a sectional side view of an essential part of a third preferred embodiment according to the present invention;

FIG. 14 is an exploded perspective view of an essential part in FIG. 13;

DETAILED DESCRIPTION OF THE PREFERRED EMBODIMENTS

There will now be described some preferred embodiments of the present invention with reference to FIGS. 1 to 15.

Figure 1:
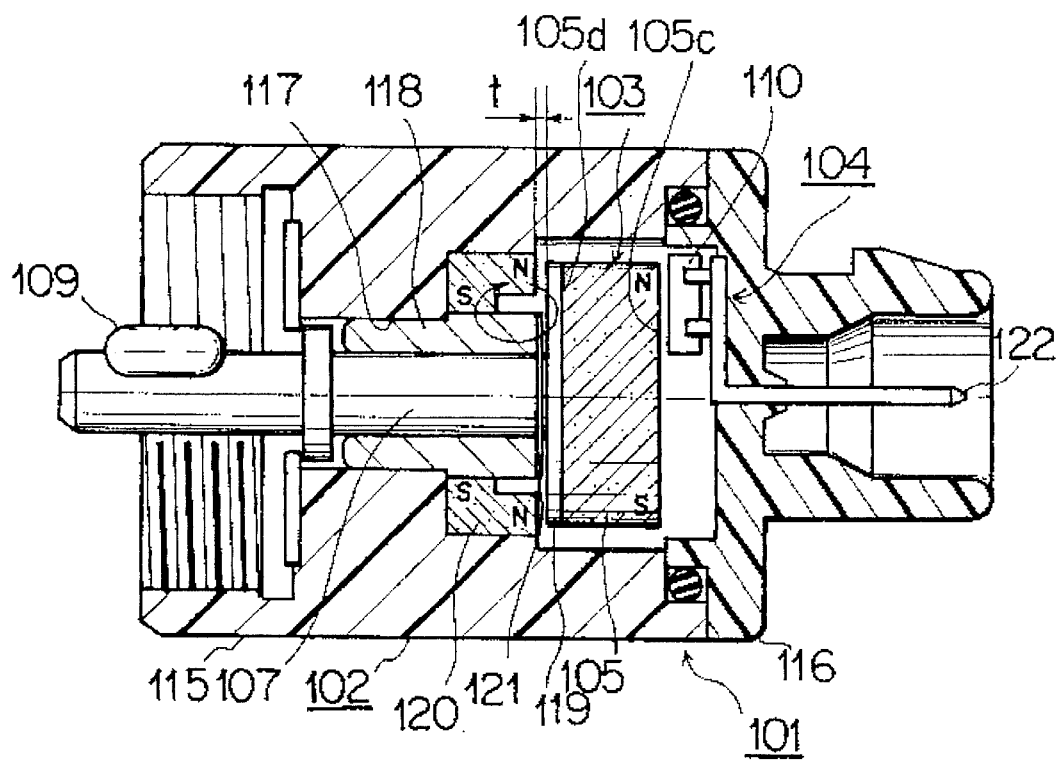
FIG. 1 is a sectional side view of a first preferred embodiment according to the present invention.
Figure 2:
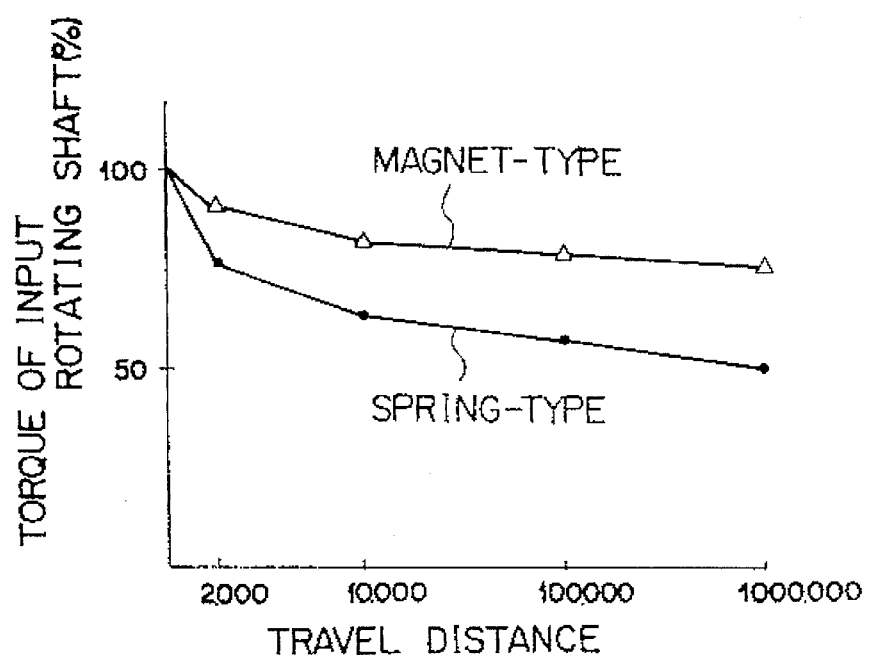
FIG. 2 is a graph showing a degree of aged deterioration of the preferred embodiment in comparison with the prior art.

Referring to FIG. 1 which shows a first preferred embodiment of the present invention, a housing 102 of a rotation detecting device 101 is composed of a body 115 and a base 116 connected to one end of the body 115. A rotating portion 103 is installed in the body 115, and a current feeding portion 104 is installed in the base 116.

The body 115 is formed with a central axial hole 117, and a bearing metal 118 formed of sintered iron, for example, is fixedly engaged in the axial hole 117. A rotor 105 is rotatably provided in the body 115. The rotor 105 is formed by molding synthetic resin mixed with magnet powder. One end surface 105c of the rotor 105 is radially magnetized to have multiple poles, so that a magnetic force may be exerted. A yoke plate 119 formed of a magnetic material is fixed to the other end surface 105d of the rotor 105. A braking magnet 120 is mounted on an outer circumference of the bearing metal 118 so as to be opposed to a radial outer portion of the yoke plate 119 with a predetermined gap t defined therebetween.

An input rotating shaft 107 is rotatably supported to an inner circumference of the bearing metal 118, and one end portion of the rotating shaft 107 is engaged in a central portion of rotor 105 having yoke plate 119. The other end portion of the rotating shaft 107 serves as a coupling 109 to be connected to a rotational driving source of a transmission (not shown). A substantially circular brake disk 121 is fixedly mounted on the rotating shaft 107 so as to face the yoke plate 119 with a fine gap defined therebetween and to be adapted to surface-contact an end surface of the bearing metal 118.

A magnetic induction device 110 such as a Hall device is provided in base 116 on the side connected to body 115 near the rotor 105 so as to face the magnetized end surface 105c of the rotor 105, particularly, a radial outer portion of the magnetized end surface 105c. The magnetic induction device 110 is connected to an end portion of a terminal 122 installed in the base 116 at a central portion thereof, so that an electric signal generated in the magnetic induction device 110 is fed through the terminal 122 to an indicating instrument or the like (not shown).

In this preferred embodiment, the rotation detecting device 101 is mounted to a transmission of an automobile.

The rotation of the transmission is transmitted through coupling 109 and input rotating shaft 107 to rotor 105. A change in magnetic field due to the rotation of the rotor 105 is detected by the magnetic induction device 110. An electric signal generated in the magnetic induction device 110 is output through the terminal 122 to a given indicating instrument which in turn indicates a speed or the like corresponding to a value of the electric signal.

As mentioned above, the brake disk 121 is fixed to the input rotating shaft 107 which is a member on the rotor 105 end, while braking magnet 120 is fixed to bearing metal 118 which is a member on housing 102 end. Accordingly, a magnetic circuit is formed between the braking magnet 120 on housing 102 end and yoke plate 119 on rotor 105 end so as to pass through bearing metal 118 and brake disk 121. As a result, yoke plate 119 is magnetically attracted to braking magnet 120 to bring brake disk 121 into surface contact with the end surface of the bearing metal 118. As a result, a braking force to be obtained by multiplying a magnetic attraction force generated in the magnetic circuit by a coefficient of friction of the brake disk 121 is applied to the rotor 105. Accordingly, play rotation of the rotor 105 can be prevented by the braking force to thereby prevent malfunction of the rotation detecting device 101. The braking force may be suitably changed by changing the gap t between the braking magnet 120 and the yoke plate 119 or changing a magnetic strength of the braking magnet 120 in itself.

In general, the degree of age deterioration of braking magnet 120 for generating the magnetic attraction force of the magnetic circuit is much smaller than the degree of settling of the spring. Accordingly, as apparent from the torque of input rotating shaft 107 proportional to the braking force shown in FIG. 2, the degree of reduction in the braking force is smaller, and the braking force is less subject to wear, to obtain a stable braking force according to the present invention as compared with the case where the spring is used as a braking mechanism in the prior art. Therefore, durability of the rotation detecting device 101 can be improved according to the present invention.

Further, in this preferred embodiment, the end surface 105c of rotor 105 not facing brake disk 121 is magnetized, and the magnetic induction device 110 is provided at a position opposed to the magnetized surface 105c. Accordingly, a change in magnetic field along the end surface of the rotor 105 can be detected by the magnetic induction device 110. As compared with the prior art device wherein a change in magnetic field is arranged along a circumferential magnetized surface of the rotor, an axial length of the rotor 105 can be reduced to thereby make compact a general construction of the rotation detecting device 101 according to this preferred embodiment.

Additionally, the number of parts can be reduced, and the structure can be simplified. Accordingly, the rotation detecting device 101 can be manufactured easily and at low cost.

Figure 3:
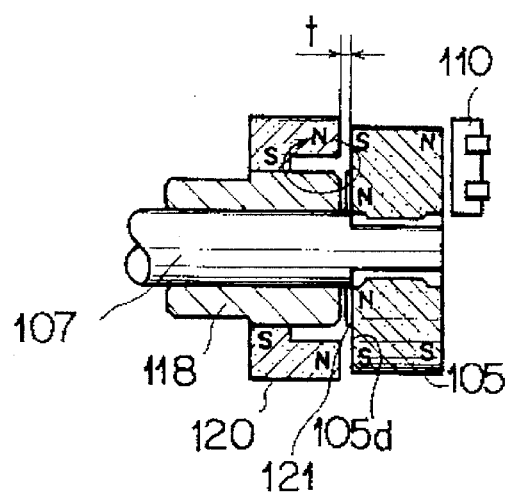
FIG. 3 is a sectional side view of an essential part of a modification of the first preferred embodiment.

Referring to FIG. 3 which shows a modification of the first preferred embodiment, the yoke plate 119 fixed to the rotor 105 in the first preferred embodiment is not provided but the end surface 105d of the rotor 105 facing the braking magnet 120 is annularly magnetized in such a manner that an N-pole is formed at a radial inner portion and an S-pole is formed at a radial outer portion. With this construction, as the yoke plate 119 is eliminated, an overall axial length of the rotation detecting device can be more reduced, and cost can be reduced.

Figure 4:
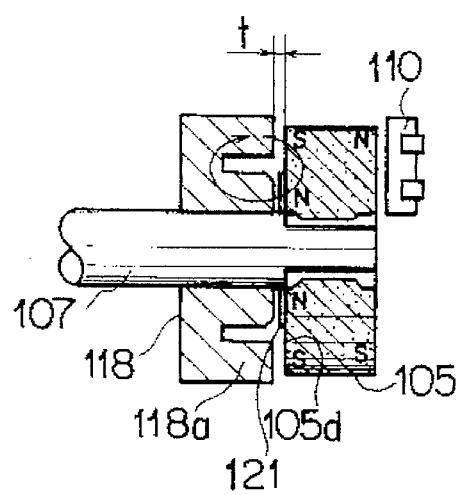

Referring to FIG. 4 which shows another modification of the first preferred embodiment, the brake disk and the braking magnet are provided on the side of the rotor 105. That is, the bearing metal 118 for supporting the input rotating shaft 107 which rotates the rotor 105 is integrally formed with an annular projection 118a projecting from an outer circumferential portion toward the rotor 105. The brake disk 121 adapted to surface-contact the bearing metal 118 is fixed to the input rotating shaft 107. The end surface 105d of the rotor 105 facing the bearing metal 118 is annularly magnetized in such a manner that an N-pole is formed at a radial inner portion and an S-pole is formed at a radial outer portion. That is, the rotor 105 serves also as the braking magnet.

In this modification shown in FIG. 4, a magnetic circuit is formed between the magnetized end surface 105d of the rotor 105 and bearing metal 118 so as to pass brake disk 121. Accordingly, the brake disk 121 is brought into pressure contact with the bearing metal 118 by a magnetic attraction force generated in the magnetic circuit. With this construction, it is not necessary to especially provide the braking magnet facing the rotor 105, thereby reducing a cost.

It is to be understood that the present invention is not limited to the above preferred embodiments but various further modifications may be made. For instance, a plurality of brake disks to be mounted on the input rotating shaft 107 may be interposed between rotor 105 and bearing metal 118 so that the gap t between rotor 105 and bearing metal 118 may be filled with the plural brake disks.

Figure 5:
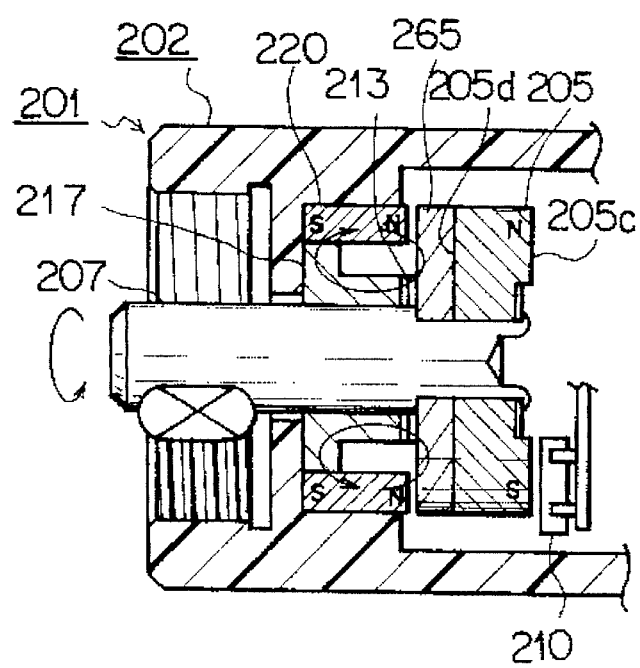
FIG. 5 is a sectional side view of an essential part of a second preferred embodiment according to the present invention.

Referring to FIG. 5 which shows a second preferred embodiment of the present invention, a rotor 205 formed by molding synthetic resin mixed with magnet powder is rotatably provided in a cylindrical housing 202. One end surface 205c of the rotor 205 is radially magnetized to have multiple poles, and a yoke plate 265 formed of a temperature sensing magnetic material is fixed to the other end surface 205d of the rotor 205. A magnetic induction device 210 such as a Hall device is provided near the rotor 205 so as to be opposed to the magnetized end surface 205c of the rotor 205. The magnetic induction device 210 detects a change in magnetic field due to the rotation of the rotor 205 and feeds an electric signal to an indicating instrument or the like (not shown).

A cylindrical braking magnet 220 is fixedly provided in the housing 202 so as to be closely opposed to the yoke plate 265 of the rotor 205. A cylindrical bearing metal 217 formed of sintered iron, for example, is fitted with an inner circumference of the braking magnet 220 so as to form a substantially U-shaped cross section in connection with the braking magnet 220. An end surface of the bearing metal 217 is opposed to the yoke plate 265. An input rotating shaft 207 is rotatably supported to the bearing metal 217. One end portion of the rotating shaft 207 is engaged with a central portion of the rotor 205, and the other end portion of the rotating shaft 207 serves as a coupling to be connected to a rotational driving source of a transmission (not shown). A plurality of thrust washers 213 are interposed between the yoke plate 265 of rotor 205 and bearing metal 217 so that a gap between yoke plate 265 and bearing metal 217 is filled with thrust washers 213.

The operation of the second preferred embodiment will now be described.

In this preferred embodiment, the rotation detecting device 201 is mounted to a transmission of an automobile. The rotation of the transmission is transmitted through the coupling and input rotating shaft 207 to rotor 205. A change in magnetic field due to the rotation of the rotor 205 is detected by the magnetic induction device 210. An electric signal generated in the magnetic induction device 210 is output to a given indicating instrument which in turn indicates a speed or the like corresponding to a value of the electric signal.

A magnetic circuit is formed between the housing 202 which is a fixed member and the rotor 205 which is a rotating member so as to pass braking magnet 220, yoke plate 265, thrust washers 213 and the bearing metal 217. Accordingly, the yoke plate 265 is magnetically attracted through the thrust washers 213 to the braking magnet 220, thus bringing the rotor 205 side (the thrust washers 213) into pressure contact with housing 202 side (bearing metal 217). As a result, braking force to be obtained by multiplying a coefficient of friction of the thrust washers 213 by a magnetic attraction force generated in the magnetic circuit is applied to the rotor 205. Therefore, play rotation of the rotor 205 can be prevented by the braking force to thereby prevent malfunction of the rotation detecting device especially under a stop or low-speed running condition of the vehicle.

As mentioned above, the yoke plate 265 disposed in the magnetic circuit is formed of a temperature sensing magnetic material. Therefore, when the rotor 205 is rotated at high speeds to generate a large frictional heat in the thrust washers 213 contacting the bearing metal 213, temperature of the yoke plate 265 is increased by the frictional heat to cause a reduction in magnetic permeability of the yoke plate 265. As a result, the magnetic attraction force to be generated in the magnetic circuit is reduced, and the braking force to be applied to the rotor 205 is therefore reduced.

Figure 6:
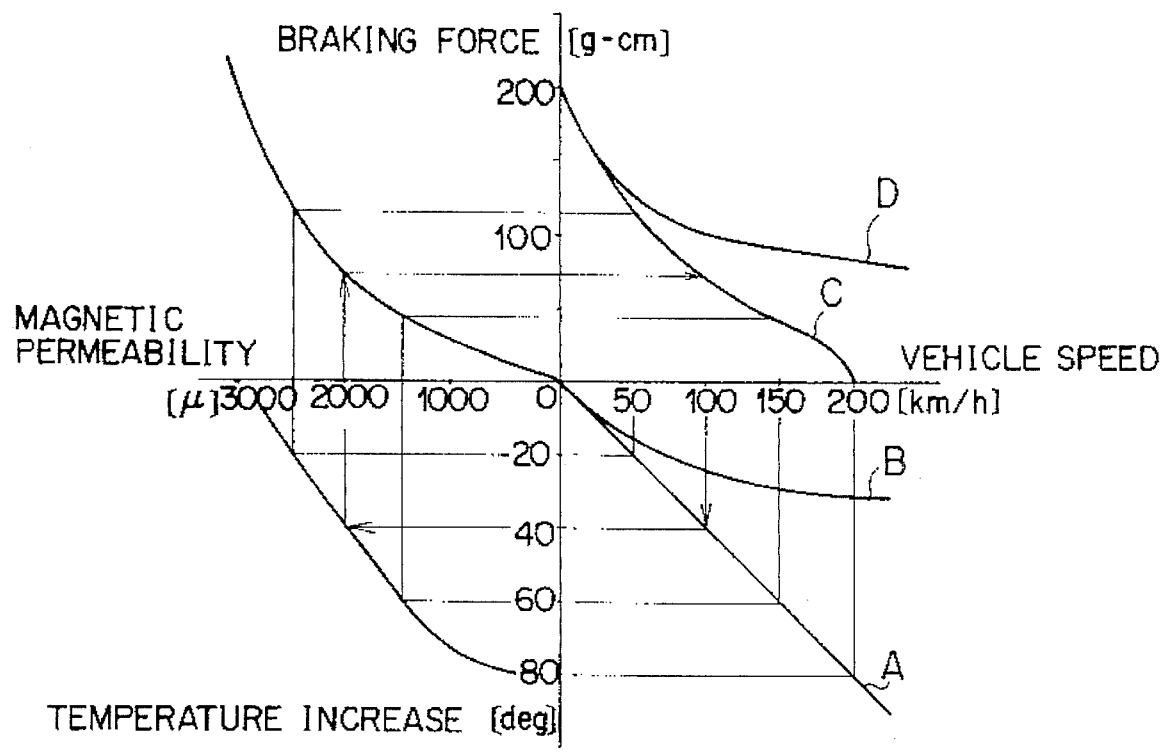
FIG. 6 is a graph showing the relationship among a braking characteristic, a temperature increase characteristic due to frictional heat, a temperature sensing magnetic material characteristic, and a magnetic attraction force in the second preferred embodiment.

Assuming that the braking force to be obtained from the magnetic attraction force in the magnetic circuit under a stop condition of the vehicle is 200 g-cm as shown in FIG. 6, a temperature increase due to the frictional heat at the contact portion between rotor 205 and housing 202 during running of the vehicle at a speed of 100 km/hour is 40 deg., and the magnetic permeability of the yoke plate 265 formed of a temperature sensing magnetic material is reduced to about 2000μ, with the result that the braking force is reduced to about 76 g-cm. Further, during running of the vehicle at a speed of 200 km/hour, the magnetic permeability becomes zero. That is, the yoke plate 265 becomes non-magnetic. Therefore, no magnetic attraction force is generated between the braking magnet 220 and the yoke plate 265, resulting in no application of the braking force to the rotor 205. In an initial stage of the temperature increase due to the frictional heat at the contact portion, the temperature is rapidly increased as shown by a straight line A in FIG. 6. After the initial stage, the temperature increase becomes gentle and stable as shown by a curved line B in FIG. 6. The braking force is also rapidly reduced in the initial stage in association with the temperature increase as shown by a curved line C in FIG. 6. However, after the initial stage, the braking force is reduced gently and stably as shown by a curved line D in FIG. 6. The curved line D is approximated to the braking characteristic shown in FIG. 9. Consequently, only during low-speed rotation of the rotor 205 where the play rotation of the rotor 205 tends to occur, that is, only under the stop or low-speed running condition of the vehicle, the braking force owing to the magnetic attraction force is sufficient. To the contrary, during high-speed rotation of the rotor 205, the braking force is reduced.

As described above, the play rotation of the rotor 205 is prevented by the braking force owing to the magnetic attraction force of the braking magnet 220 rather than a biasing force of a spring as in the prior art, thereby preventing malfunction of the rotation detecting device. Furthermore, since a degree of aged deterioration of the braking magnet 220 is smaller than a degree of settling of a spring, a stable braking force can be obtained for a long time, thus improving a durability and a reliability of the rotation detecting device.

Further, as the yoke plate 265 formed of a temperature sensing magnetic material is provided in the magnetic circuit, the braking force is sufficiently obtained only during low-speed rotation of the rotor 205 where the play rotation of the rotor 205 tends to occur, only under the stop or low-speed running condition of the vehicle, while under a high-speed running condition where the rotor 205 is rotated at high speeds, the braking force owing to the magnetic attraction force is reduced. Thus, an optimum braking characteristic to be required for a braking mechanism in the rotation detecting device can be obtained. Moreover, excess temperature increase due to the frictional heat to be generated at the contact portion between the rotor 205 and the housing 202 can be prevented to thereby avoid undesired influence of the heat. Accordingly, a durability and a reliability of the rotation detecting device can be improved.

Figure 7:
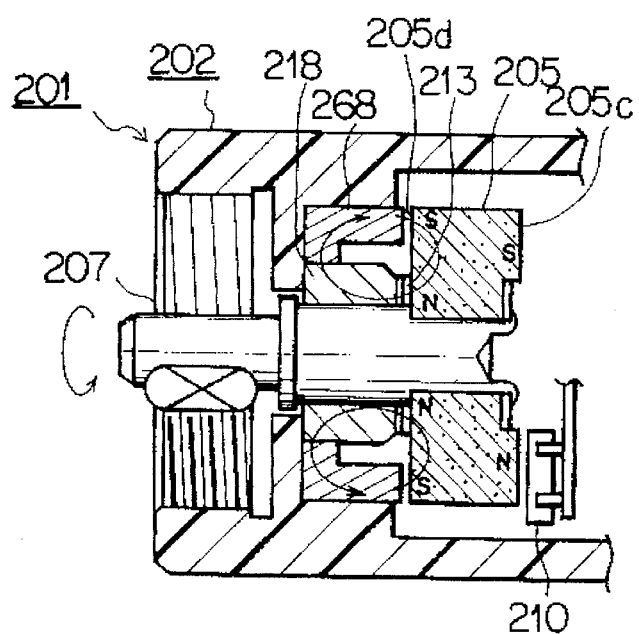
FIG. 7 is a view similar to FIG. 5, showing a modification of the second preferred embodiment.

Referring to FIG. 7 which shows a modification of the second preferred embodiment, the temperature sensing magnetic yoke plate 265 fixed to the end surface 205d of the rotor 205 in the second preferred embodiment is not provided but the end surface 205d is annularly magnetized in such a manner that an N-pole is formed at a radial inner portion and an S-pole is formed at a radial outer portion. That is, the end surface 205d of the rotor 205 serves as the braking magnet. Further, a cylindrical temperature sensing magnetic member 268 and a cylindrical bearing metal 218 are fixedly provided in the housing 202 so as to be opposed to the end surface 205d of the rotor 205. In this modification, the operation and the effect similar to those in the second preferred embodiment can be obtained. Additionally, as the yoke plate 265 is eliminated in this modification, overall axial length of the rotation detecting device can be reduced, and a cost can be reduced.

Figure 11:
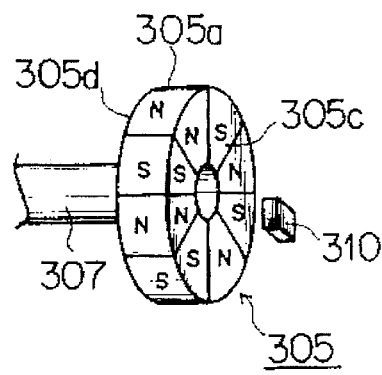
FIG. 11 is a perspective view of a rotating portion shown in FIG. 10.
Figure 12:
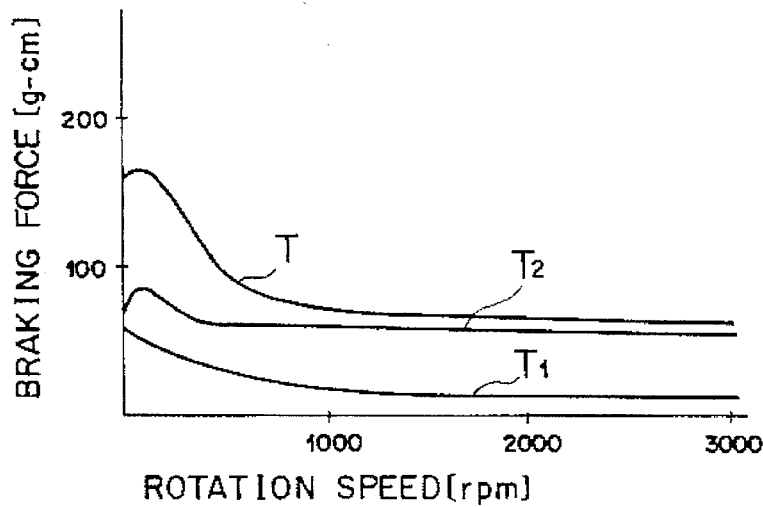
FIG. 12 is a graph showing a braking torque characteristic of the rotor according to the third preferred embodiment.

Referring to FIGS. 10 to 12 which show a third preferred embodiment of the present invention, rotor 305 is rotatably provided in a housing 302 of a rotation detecting device 301. As shown in FIG. 11, an outer circumferential surface 305a and a right end surface 305c of the rotor 305 are magnetized to have multiple poles. An input rotating shaft 307 is rotatably supported to a bearing metal 318. One end portion of the input rotating shaft 307 is engaged with a central portion of the rotor 305, and a coupling (not shown) is adapted to be inserted into the other end portion of the rotating shaft 307. The coupling is connected to a rotational driving source of a transmission (not shown). Accordingly, rotation of the transmission is transmitted through the coupling and the input rotating shaft 307 to the rotor 305.

A disk-shaped thrust braking yoke 366 formed of a magnetic material is fixed to a non-magnetized left end surface 305d of the rotor 305. A braking magnet 320 is fixedly mounted on the bearing metal 318 so as to be opposed to the thrust braking yoke 366 with a washer 313 interposed therebetween. An annular circumferential braking yoke 369 formed of a magnetic material is provided on an inner surface of the housing 302 so as to be opposed to an outer circumferential surface of the rotor 305. Accordingly, a magnetic attraction force is generated between the thrust braking yoke 366 and the braking magnet 320, and a magnetic attraction force is generated between the circumferential braking yoke 369 and the rotor 305. Owing to these magnetic attraction forces, a predetermined braking torque is applied to the rotor 305. This braking torque is reduced as rotating speed of the rotor 305 increases.

A magnetic induction device 310 is provided near the rotor 305 so as to be opposed to the magnetized end surface 305c of the rotor 305, so that an electric signal to be generated from the magnetic induction device 310 due to a change in magnetic field during rotation of the rotor 305 is fed to an indicating instrument or the like (not shown).

The operation of the third preferred embodiment will now be described.

In this preferred embodiment, the rotation of a transmission of an automobile is transmitted through the coupling and input rotating shaft 307 to rotor 305. A change in magnetic field is generated during the rotation of rotor 305 is detected by magnetic induction device 310. Accordingly, an electric signal is output from the magnetic induction device 310 to a given indicating instrument which in turn indicates a speed or the like corresponding to a value of the electric signal.

At this time, a magnetic attraction force is generated between thrust braking yoke 366 and braking magnet 320, and a magnetic attraction force is generated between the circumferential braking yoke 369 and the rotor 305. As a result, a predetermined braking torque due to these magnetic attraction forces is applied to the rotor 305. This braking torque is reduced as a rotating speed of the rotor 305 increases.

That is, when the rotor 305 starts rotating, an alternating field is applied to the circumferential braking yoke 369 to generate an eddy current. As a result, heat is generated in the yoke 369. Thus, a magnetic energy is converted into heat energy, so that the magnetic attraction force between the circumferential braking yoke 369 and the rotor 305 is reduced. Therefore, as shown in FIG. 12, a braking torque $T_1$ due to the magnetic attraction force between the yoke 369 and the rotor 305 is reduced. On the other hand, a braking torque $T_2$ due to the magnetic attraction force between the thrust braking yoke 366 and the braking magnet 320 is generated as shown in FIG. 12. Accordingly, a synthetic braking torque T as the sum of both the braking torques $T_1$ and $T_2$ is obtained. As apparent from FIG. 12, the synthetic braking torque T is large during low-speed rotation of the rotor 305, and it is small during high-speed rotation of the rotor 305.

Accordingly, a stable and proper braking torque can be obtained according to a rotating speed of the rotor 305. Furthermore, as the braking force is obtained in both the circumferential direction and the thrust direction of the rotor 305 by the circumferential braking yoke 369 and the thrust braking yoke 366, respectively, a thrust load can be reduced as compared with the prior art device, thereby reducing an amount of wear of the bearing metal 318 or the like and accordingly improving a durability of the rotation detecting device.

Figure 13:
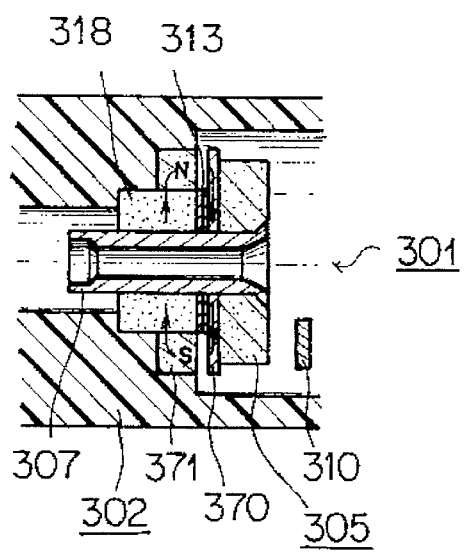
FIG. 13 is a view similar to FIG. 10, showing a modification of the third preferred embodiment.
Figure 14:
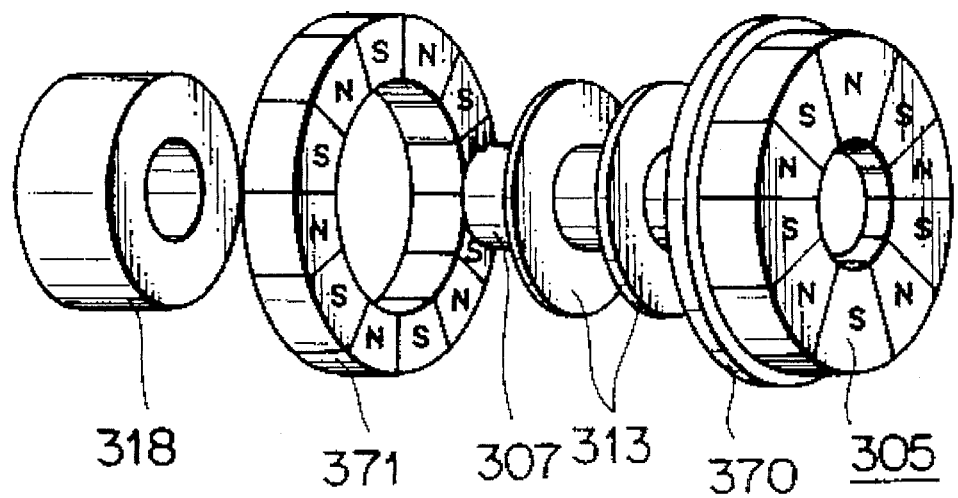
FIG. 14 is a view similar to FIG. 3, showing another modification of the first preferred embodiment.
Figure 15:
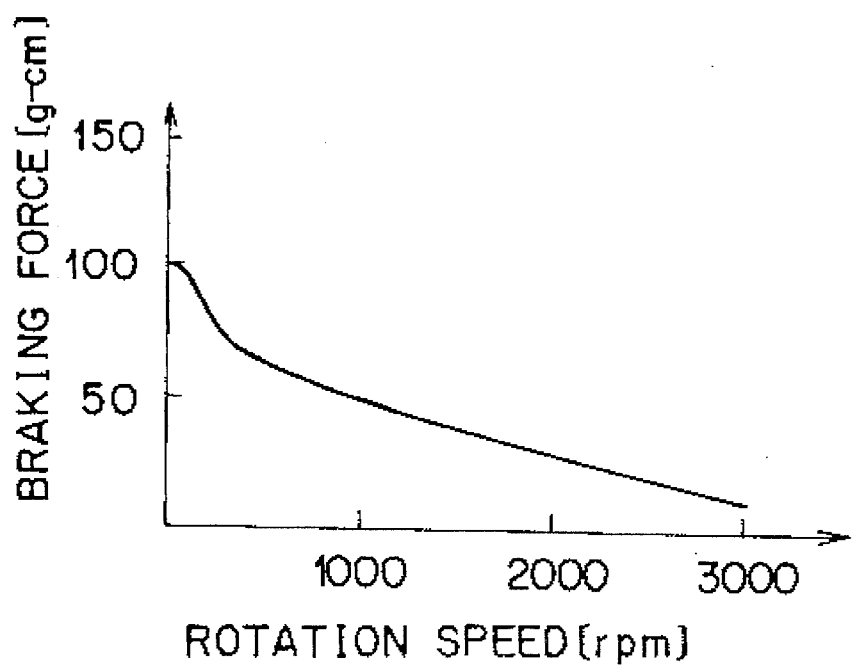
FIG. 15 is a graph showing a braking torque characteristic of the rotor according to the modification of FIG. 13.
Figure 16:
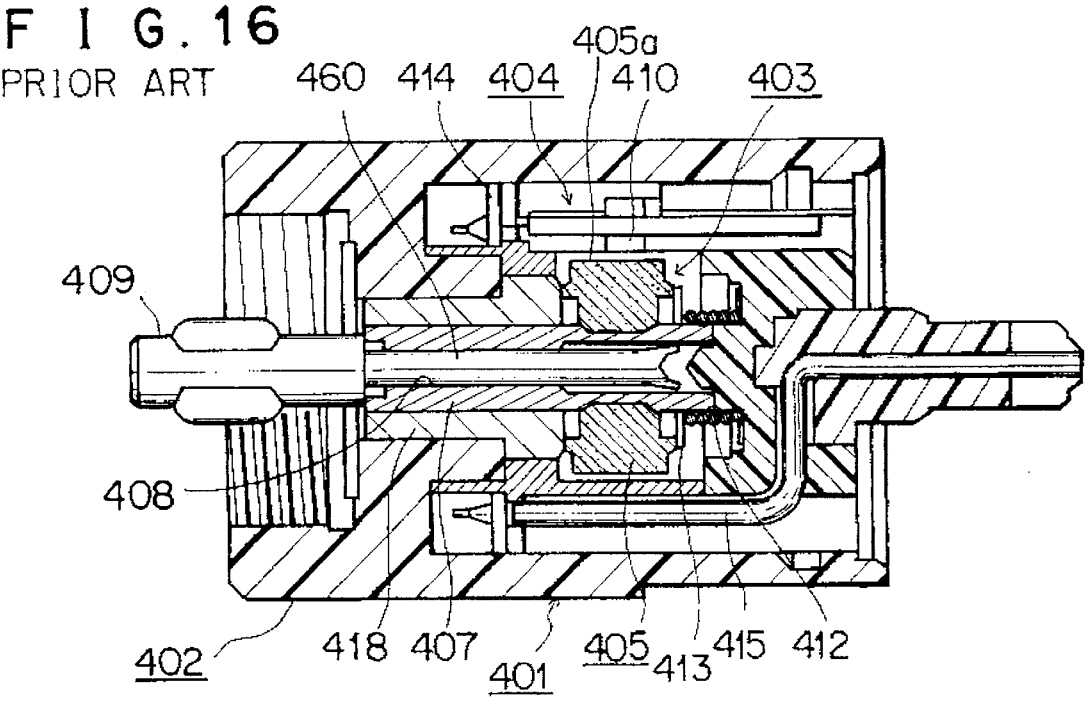
FIG. 16 is a sectional side view of the rotation detecting device in the prior art.
Figure 17:
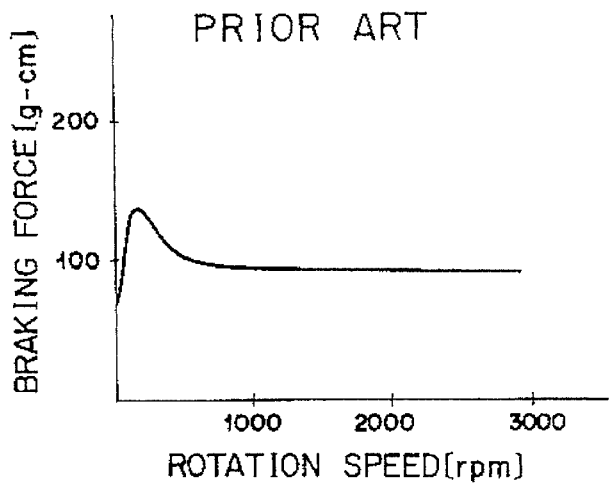
FIG. 17 is a graph showing a braking torque characteristic of the rotor in the prior art device.
Figure 18:
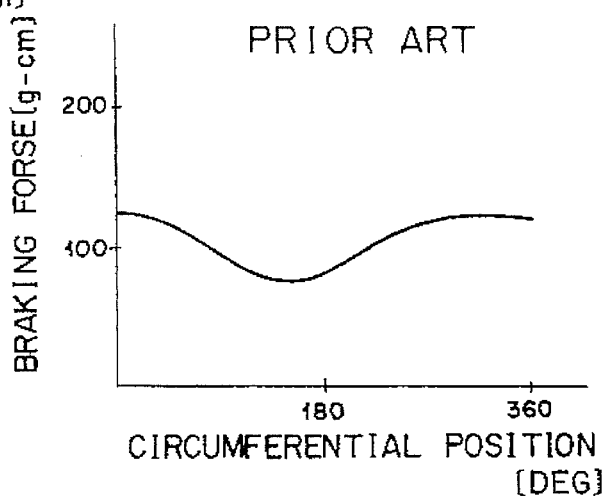
FIG. 18 is a graph showing a braking torque characteristic of the rotor with respect to a circumferential position thereof in the prior art device using a spring.

Referring to FIGS. 13 to 15 which show a modification of the third preferred embodiment, the circumferential braking yoke 369 in the third preferred embodiment is not provided but a thrust braking yoke only is provided. In this modification, the thrust braking yoke is formed of a specific material, and the braking magnet has multiple poles.

As shown in FIG. 13, a thrust braking yoke 370 is fixed to one end surface of rotor 305 rotatably provided in housing 302. The thrust braking yoke 370 is formed of a material capable of generating a large eddy current loss (e.g., a non-magnetized magnet material). The eddy current loss can be calculated in accordance with an equation to be hereinafter described. Further, one end portion of the input rotating shaft 307 rotatably supported to the bearing metal 318 is fixed to a central portion of the rotor 305, and the other end portion of the input rotating shaft 307 is connected to a rotational driving source of a transmission (not shown). The bearing metal 318 formed of sintered iron, for example, for supporting the input rotating shaft 307 is fixedly provided in the housing 302. An annular braking magnet 371 is fixed to an outer circumference of the bearing metal 318. An end surface of the braking magnet 371 opposed to the rotor 305 is magnetized to have multiple poles.

The above-mentioned eddy current loss is calculated in accordance with the following equation.

$$We=(1/6\ \rho)\pi^2 f^2 Bm^2 t^2$$

where We represents an eddy current loss; ρ a specific resistance; f an exciting frequency; Bm a maximum operating magnetic flux density; and t a plate thickness. The material for the thrust braking yoke 370 is a material capable of generating a large eddy current loss We, that is, a magnetic material having a low specific resistance such as a non-magnetized magnet material. For example, Fe—Mn semi-rigid magnet may be used as the non-magnetized magnet material.

The end surface of the rotor 305 opposed to the magnetic induction device 310 such as a Hall device is also magnetized to have multiple poles. A pair of washers 313 are interposed between the thrust braking yoke 370 and the bearing metal 318. The thrust braking yoke 370 is magnetically attracted through washers 313 to braking magnet 371, and washers 313 are brought into pressure contact with the bearing metal 318 to thereby obtain a predetermined braking torque.

The operation of this modification will now be described.

When the rotor 305 is rotated with the input rotating shaft 307, an alternating field is applied to the thrust braking yoke 370 to generate an eddy current. Accordingly, heat is generated in the thrust braking yoke 370, and a magnetic attraction force between the thrust braking yoke 370 and the braking magnet 371 is reduced because of the generation of such a heat energy, that is, an eddy current loss as the rotating speed of the rotor 305 increases. As a result, a braking torque is reduced as the rotating speed of the rotor 305 as shown in FIG. 15.

In this modification, a proper braking force can be ensured when the rotating speed of the rotor 305 is low. Accordingly, play rotation of the rotor 305 during low-speed rotation to be caused by vibration of the vehicle can be reliably prevented. On the contrary, when the rotating speed of the rotor 305 becomes high, the braking force to be applied in the thrust direction of the rotor 305 is reduced to thereby remarkably reduce an amount of wear of the bearing metal 318 or the like and accordingly extend the life of the rotation detecting device.

What is claimed is:

1. A rotation detecting device including a housing, a magnetic induction device provided in said housing, and a magnetized rotor rotatably provided in said housing near said magnetic induction device, said rotor being connected through a coupling to a rotation output source; said rotation detecting device comprising braking means forming a magnetic circuit between one end surface of said rotor and said housing and bringing said rotor into pressure contact with said housing by a magnetic attraction force to be generated in said magnetic circuit.

2. A rotation detecting device as defined in claim 1, wherein said braking means comprises a magnet, and a brake disk provided on said rotor.

3. A rotation detecting device as defined in claim 1, wherein said braking means comprises a temperature sensing magnetic member having a magnetic permeability to be reduced by heat to be generated from a contact portion between said rotor and said housing.

4. A rotation detecting device as defined in claim 1, wherein said braking means comprises a magnet having multiple poles and a braking yoke which generates an eddy current to reduce a braking torque to be applied to said rotor.

5. A rotation detecting device as defined in claim 1 further comprising another braking means forming another magnetic circuit between an oilier circumferential surface of said rotor and said housing so as to generate a braking torque between said rotor and said housing.

6. A rotation detecting device as defined in claim 1, wherein the other end surface of said rotor not contacting said housing is magnetized, and said magnetic induction device is located in opposed relationship to the other end surface.

* * * * *